(12) United States Patent
Miller (10) Patent No.: US 10,013,875 B1
(45) Date of Patent: Jul. 3, 2018

(54) PERSONAL CARE APPLIANCE INCLUDING WIRELESS INPUT INTERFACES

(71) Applicant: L'Oreal, Paris (FR)

(72) Inventor: Zane Bowman Allen Miller, Seattle, WA (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 15/476,672

(22) Filed: Mar. 31, 2017

(51) Int. Cl.
*G08C 17/02* (2006.01)
*H04B 5/00* (2006.01)

(52) U.S. Cl.
CPC ........... *G08C 17/02* (2013.01); *H04B 5/0037* (2013.01); *H04B 5/0062* (2013.01); *H04B 5/0068* (2013.01)

(58) Field of Classification Search
CPC .... G08C 17/02; H04B 5/0037; H04B 5/0062; H04B 5/0068
See application file for complete search history.

(56) References Cited

U.S. PATENT DOCUMENTS

| | | | |
|---|---|---|---|
| 5,551,701 A | 9/1996 | Bouton et al. | |
| 2009/0054146 A1 | 2/2009 | Epstein et al. | |
| 2016/0280069 A1* | 9/2016 | Laute | H02J 50/10 |
| 2017/0095070 A1* | 4/2017 | Machiorlette | A46B 15/0002 |

FOREIGN PATENT DOCUMENTS

EP 1 765 474 11/2005

OTHER PUBLICATIONS

Ma, M., "Paper Gets 'Smart' With Drawn-On, Stenciled Sensor Tags," University of Washington, May 11, 2016, <http://www.washington.edu/news/2016/05/11/paper-gets-smart-with-drawn-on-stenciled-sensor-tags/> [retrieved May 18, 2017], 5 pages.

* cited by examiner

*Primary Examiner* — Leon Flores
(74) *Attorney, Agent, or Firm* — Christensen O'Connor Johnson Kindness PLLC; Andrew L. Laughlin (57) ABSTRACT

Personal care appliances and systems including wireless input interfaces and related methods of use are described.

20 Claims, 6 Drawing Sheets

PERSONAL CARE APPLIANCE INCLUDING WIRELESS INPUT INTERFACES

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure provides a personal care appliance generally including an input interface configured to be removably affixed to an outer surface of the personal care appliance, the input interface generally including a transponder configured to be selectively capable or incapable of transmitting a signal; a reader configured to receive signals from the transponder; and a computing arrangement including circuitry configured to decode signals received by the reader and to actuate the personal care appliance based on the received signals.

In accordance with any of the embodiments disclosed herein, the input interface may be configured to wirelessly couple to the personal care appliance and to detect the personal care appliance.

In accordance with any of the embodiments disclosed herein, the computing arrangement may be configured to decode signals received by the reader and to actuate the personal care appliance based on the received signals.

In accordance with any of the embodiments disclosed herein, the input interface may be one of a plurality of input interfaces, each including a transponder configured to be selectively capable or incapable of transmitting a signal through physical actuation, and wherein each of the plurality of input interfaces may be configured to be removably affixed to the outer surface of the personal care appliance in user-selectable locations. In certain embodiments, each of the plurality of input interfaces may be configured to be selectively capable or incapable of transmitting a unique signal. In certain embodiments, the computing arrangement may be configured to actuate the personal care appliance according to a parameter or set of parameters corresponding to and in response to the unique signal.

In accordance with any of the embodiments disclosed herein, the reader may be one of a plurality of readers. In certain embodiments, the computing arrangement may be configured to iteratively power each of the plurality of readers. In certain embodiments, the plurality of readers may be configured to have partially-overlapping electromagnetic fields.

In accordance with any of the embodiments disclosed herein, the reader may be configured to transmit an interrogation signal, and wherein the transponder may be energized upon receipt of the interrogation signal. In certain embodiments, the transponder may be configured to transmit a signal when a circuit of the transponder is closed. In certain embodiments, the transponder may be configured to not transmit a signal when a circuit of the transponder is open. In certain embodiments, a circuit of the transponder may be configured to be closed or opened in response to physical actuation.

In accordance with any of the embodiments disclosed herein, the input interface and the reader may be configured as part of a wireless communications system selected from the group consisting of a radio frequency identification device (RFID) system, a near-field communications (NFC) system, a Bluetooth system, a magnetic reed switch system, and an optical proximity sensing system.

In accordance with any of the embodiments disclosed herein, the input interface and the reader may be configured as part of a radio frequency identification device.

In accordance with any of the embodiments disclosed herein, wherein the reader may be configured to supply power to the transponder via the transmission of an interrogation signal.

In accordance with any of the embodiments disclosed herein, the input interface generally includes a plurality of transponders each generally including a circuit including an antenna and an integrated circuit, wherein each circuit may be configured to transmit a signal in response to physical actuation that completes the circuit. In certain embodiments, wherein each transponder is configured to be selectively capable or incapable of transmitting a unique signal by completing the circuit of the respective transponder, and wherein the computing arrangement is configured to actuate the personal care appliance according to a parameter or set of parameters corresponding to and in response to each unique signal.

In accordance with any of the embodiments disclosed herein, the input interface may be configured to be removably affixed to the outer surface of the personal care appliance with an adhesive.

In accordance with any of the embodiments disclosed herein, the input interface may be configured to be removably affixed to the outer surface of the personal care appliance via one of an adhesive and hook and loop fasteners.

In accordance with any of the embodiments disclosed herein, the personal care appliance may generally include a communication interface configured to link the personal care appliance with an associated client device. In certain embodiments, the communication interface may be configured to assign a parameter or set of parameters of the personal care appliance to the input interface in response to instructions received from the client device.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The present disclosure relates generally to handheld personal care appliances, systems, and methods. Generally described, personal care appliances typically use input interfaces, such as push buttons, rocker or slide switches, etc., to control the operation of the appliance in order to produce desired functional results. Examples of such appliances include power skin brushes, power toothbrushes and shavers, among others.

In currently available personal care appliances, these input interfaces are fixed in place on the outer surface of the appliance's handle. However, users' hands vary in size and shape and, accordingly, a particular user's hands may not comfortably conform to buttons fixed in place on the surface of a personal care appliance. Such a user may experience decreased control over the personal care appliance and experience discomfort when using it. Furthermore, buttons fixed in place may accommodate right-handed users comfortably, but not left-handed users and vice versa.

To that end, the following discussion provides examples of personal care appliances that have one or more input interfaces, such as buttons, that can be positioned at any number of locations on the personal care appliance in order to allow a user to obtain better control over the personal care appliance and experience greater comfort when doing so. As will be described in more detail below, the one or more input interfaces are configured to wirelessly communicate with the appliance's electronics in order to control, for example, the functionality of the appliance. In that regard, as will be described in more detail below, the one or more input interfaces are configured to allow a user to define their position and/or orientation on the appliance.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
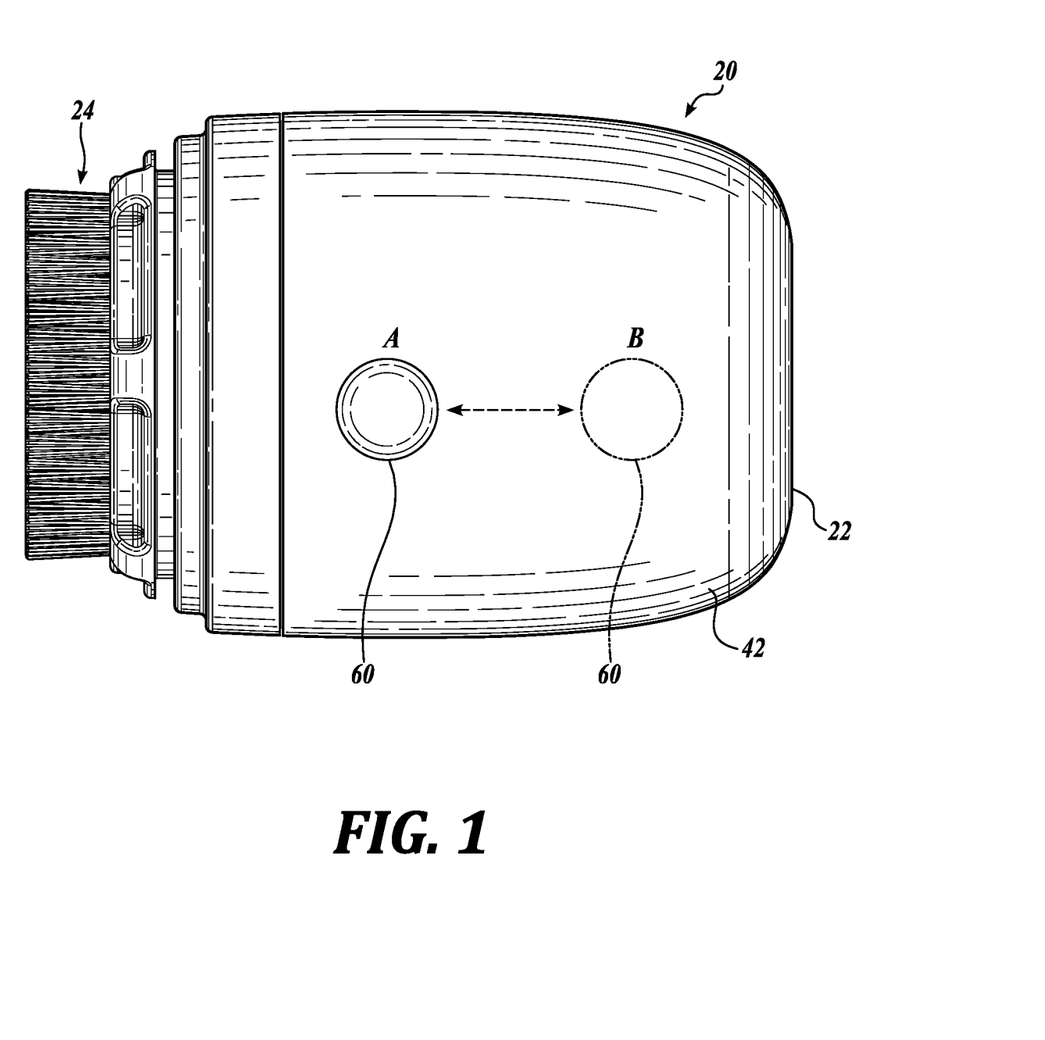
FIG. 1 is a perspective view of a representative embodiment of an appliance in accordance with an aspect of the disclosure.

FIG. 1 illustrates a representative handheld appliance, shown as a personal care appliance 20, which includes a handle assembly 22 to which a treatment applicator or end effector 24, such as a brush head, is detachably coupled. The appliance 20 also includes one or more input interfaces 60 that are affixed to an outer surface 42 of the personal care appliance 20 in user selectable locations. As will be described in more detail below, the input interfaces 60 do not have a predefined, and in some instances, permanent location, but instead can be moved to any location on the outer surface 42.

For example, as shown in FIG. 1, an input interface 60 can be placed on the outer surface 42 of the personal care appliance 20 in position A, which is easily reached by a hand of a user, or position B, which is not as easily reached by the hand of the user. As described herein, the personal care appliances 20 include input interfaces 60 that are movable without losing their functionality in order to be placed anywhere on the outer surface 42. The adjustable nature of these input interfaces 60 affords users the ability to configure the input interfaces 60 with respect to position and orientation in a manner that best fits their bodies, thereby providing greater control and comfort in use.

In some embodiments, the one or more input interfaces 60 are removably affixed using reusable self-adhesive, hook and loop fasteners or other similar techniques or methodologies that allow the input interfaces 60 to be repeatedly affixed to and removed from the appliance 20. In other embodiments, the input interfaces are provided separately from the appliance 20 within the point of sale packaging of the appliance 20. In these embodiments and others, the input interfaces 60 can be positioned at any user-selectable location along the appliance 20. Once positioned, the input interfaces 60 can be permanently affixed to the appliance 20 via curable adhesives, heat bonding, etc.

Figure 5:
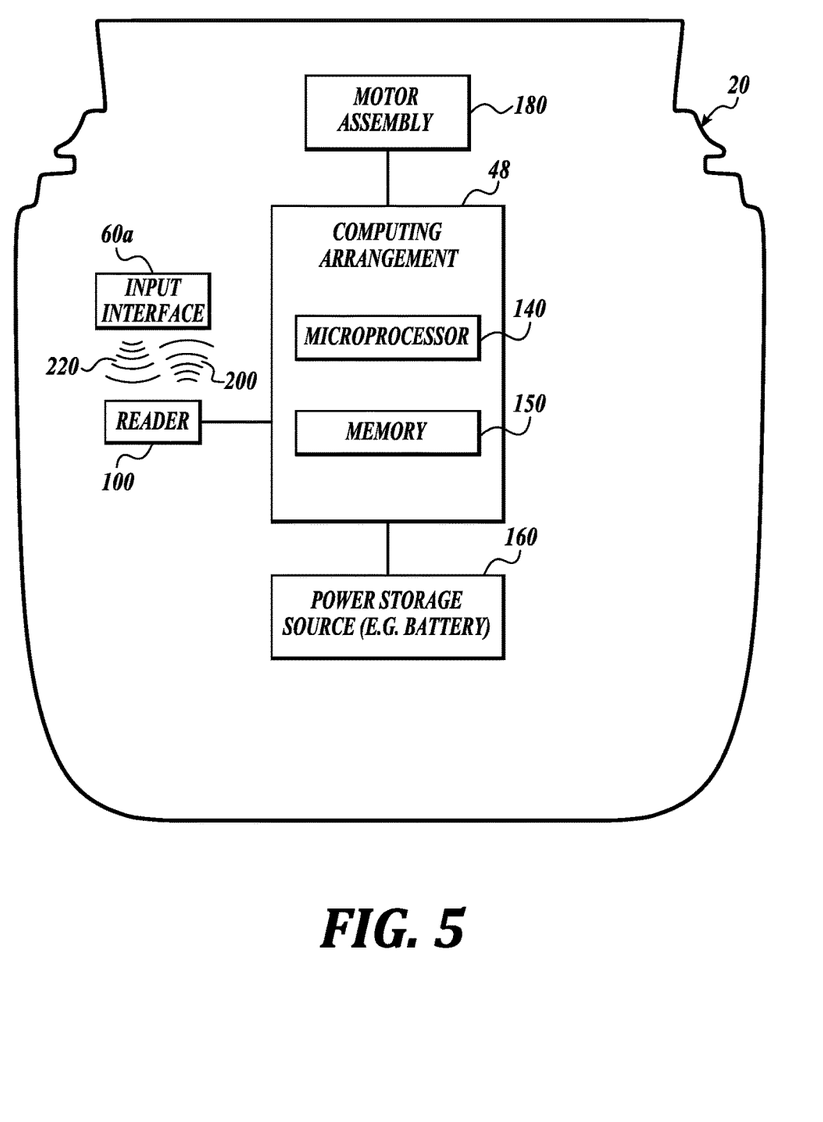
FIG. 5 schematically illustrates the appliance of FIG. 1.

Turning now to FIG. 5, a schematic representation of the appliance 20 is shown. As shown in FIG. 5, the input interface 60 interacts with the electronics of the appliance 20 for controlling one or more operations of the appliance 20. In the embodiment shown, the electronics include an electric motor assembly 180, a computing arrangement 48, and a power storage source 160, such as a rechargeable battery. The computing arrangement 48 in some embodiments includes circuitry, such as a microprocessor 140 and memory 150, that is configured and arranged to control the operation of the motor assembly 180. In some embodiments, the memory 150 includes one or more programs, which, for example, when executed by the microprocessor 140 causes the motor assembly 180 to be operated according to a treatment regimen or protocol. The motor assembly 180 in some embodiments includes an electric motor that drives an attached end effector 24, such as the illustrated brush head.

The appliance 20 further includes a wireless communications system that transmits and receives wireless signals between the one or more input interfaces 60 and the computing arrangement 48. In some embodiments, the wireless communications system includes a receiver or a transceiver, such as a reader 100, coupled in communication with the computing arrangement 48. In an embodiment, the reader 100 is configured to transmit or broadcast an interrogation signal 200 and receive a control signal 220 from an input interface 60. Such a control signal 220, when received by the reader 100 and decoded by the computing arrangement 48, causes the computing arrangement 48 to actuate the motor assembly 180 in a manner associated with the control signal 220. In order to communicate with the reader 100, each input interface 60 includes a transmitter or a transceiver, such as transponder 62. As will be described in more detail below, each input interface 60 includes a sensor, such as a switch, the activation of which causes the transponder 62 to transmit a control signal to the reader 100. In some embodiments, the transponder 62 is configured to transmit a control signal 220 to the reader 100 in response to both receiving an interrogation signal 200 from the reader 100 and activation of the input interface switch.

In some embodiments, the transponder 62 and the reader 100 are configured as part of the wireless communications system selected from a group consisting of a radio frequency identification device (RFID) system, a near-field communications (NFC) system, a Bluetooth system, among others. Accordingly, these embodiments of the wireless communications system of the appliance 20 operate under any currently known or future developed RFID, NFC or Bluetooth protocol. In some embodiments, the wireless communications system is configured as an active reader passive tag (ARPT) system. In some embodiments of the ARPT system, the reader 100 is configured to power the transponder 62 through inductive coupling. In these embodiments and others, the reader 100 can include its own power source or receive power from the power storage source 160 via suitable power regulation circuitry. In other embodiments, the wireless communications system is configured as an active reader active tag (ARAT) system. In some embodiments of the ARAT system, the reader 100 is configured with its own power source, such as battery or capacitor. In yet other embodiment of the disclosure, the wireless communications system is configured as a magnetic reed switch device, an optical proximity sensing device, etc., in order for the input interface 60 to signal the reader 100.

Figures 2A, 2B, 2C, 3:
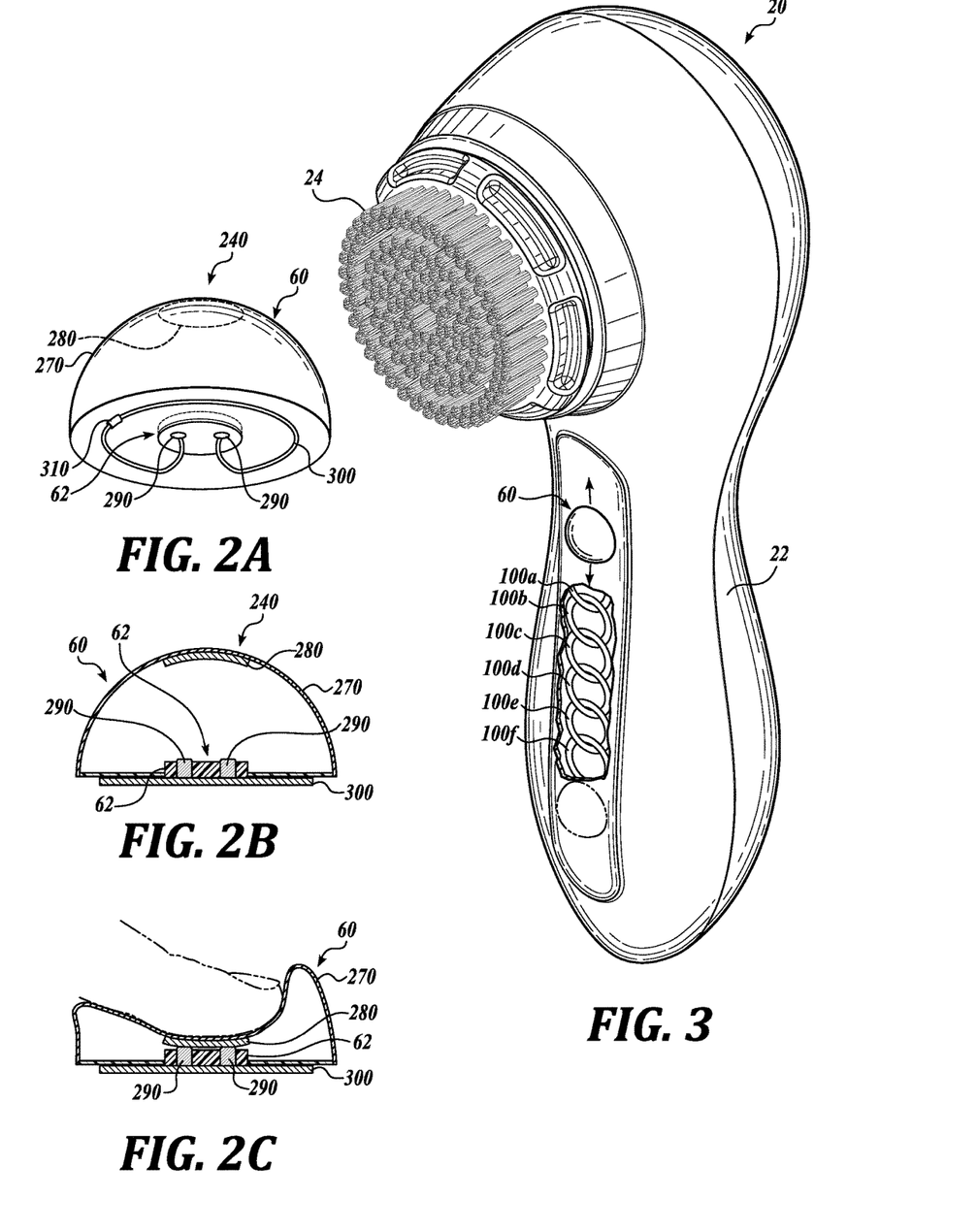
FIG. 2A is bottom perspective view of one representative embodiment of an input interface in accordance with an aspect of the disclosure.
FIG. 2B is a cross-sectional view of the input interface of FIG. 2B.
FIG. 2C is cross-sectional view of the input interface of FIG. 2B in a depressed or actuated state.
FIG. 3 is another embodiment of an appliance in accordance with an aspect of the disclosure

Turning now to FIGS. 2A-2C, an embodiment of the input interface 60 will be described in more detail. As shown in FIGS. 2A-2C, the input interface 60 includes a push-button switch 240 and the transponder 62. In an embodiment, the transponder 62 comprises an antenna 300 configured to receive an incident reader signal and to transmit a transponder identification signal, and circuitry, such as an integrated circuit 310, that is configured to store an identifier configured to uniquely identify the transponder 62 and to process information, modulate and demodulate a radio-frequency (RF) signal, and collect power from the incident reader signal. Accordingly, in an embodiment, the input interface 60 is configured to wirelessly couple to the personal care appliance 20 and to detect the personal care appliance 20. In an embodiment, the transponder 62 is capable of transmitting the transponder identification signal, such as signal 220, by completing a circuit between the integrated circuit 310 and the energized antenna 300. In an embodiment, the transponder 62 is incapable of transmitting a signal 220 by disconnecting the circuit between the integrated circuit 310 and the energized antenna 300.

In an embodiment, the circuit between the integrated circuit 310 and the energized antenna 300 can be closed via actuation of push-button switch 240. In the embodiment shown in FIGS. 2A-2C, the push button switch 240 includes a depressible, generally domed-shape actuator 270, a contact bridge 280 mounted at the top of the generally domed-shape actuator 270, and contacts 290 formed at the end of a loop antenna 300 of the transponder 62. In use, the contact bridge 280 is configured and arranged to make contact with the contacts 290 when the actuator 270 is depressed, as shown in FIG. 2C, thereby closing the circuit. In other words, the push-button switch completes the circuit by bringing the contact bridge 280 in conductive communication with the contacts 290. When antenna 300 is energized by an interrogation signal 200 and the contact bridge 280 is in conductive communication with the contacts 290, the antenna 300 is configured to power the integrated circuit 310. In another embodiment, subsequent pressing of the push-button disconnects the circuit, thereby making the input interface 60 incapable of transmitting a signal.

In an embodiment, the input interface 60 is configured such that physical actuation of the push-button switch 240 provides tactile feedback to the user indicating that the button has been pressed. For example, the actuator 270 can be spring-loaded and configured to provide resistance to physical actuation. Other configurations that provide tactile feedback can also be employed in embodiments of the disclosure.

In accordance with another aspect of the disclosure, the personal care appliance 20 may include a plurality of readers 100. In an embodiment, the plurality of readers is disposed within the handle assembly 22. For example, as depicted in FIG. 3, the plurality of readers 100a-100f are disposed within the handle assembly 22 of the personal care appliance 20, and are each configured to broadcast an interrogation signal 200, as briefly described above. Each interrogation signal 200 is capable of energizing the transponder of an input interface, such as input interface 60, if the antenna of the transponder is within its broadcasted range. In some of these embodiments, the computing arrangement 48 of the appliance 20 is programmed to iteratively power each of the plurality of readers 100a-100f. In so doing, the computing arrangement 48 is configured to select a best fidelity between the input interface 60 and one of the plurality of readers 100a-100f. Since the input interface 60 in some embodiments are configured to be removably affixed to the outer surface 42 of the personal care appliance 20, they can be removably affixed in a position or in an orientation that couples well with one or more of the readers 100a-100f, but not as well with others. Accordingly, in certain aspects, the plurality of readers 100a-100f can be disposed within the handle assembly 22 to have partially-overlapping electromagnetic fields. In this way there are no or few portions of the handle assembly 22 that will have poor coupling with an input interface 60.

Figure 4A:
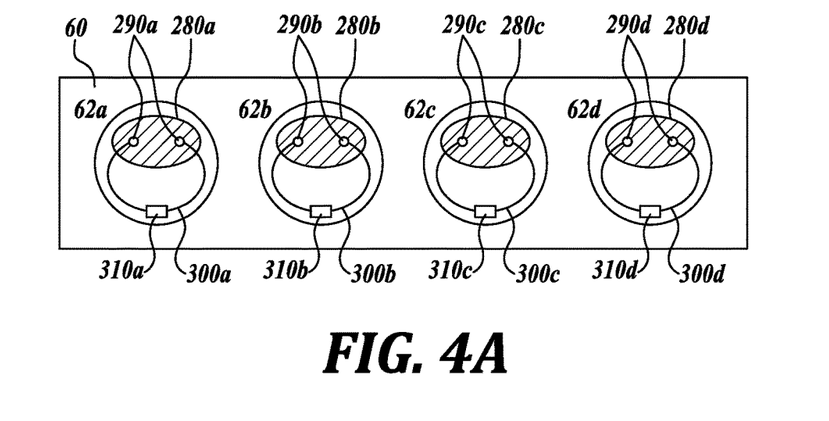
FIG. 4A is top view of one representative embodiment of a set of input interfaces in accordance with an aspect of the disclosure.
Figure 4B:
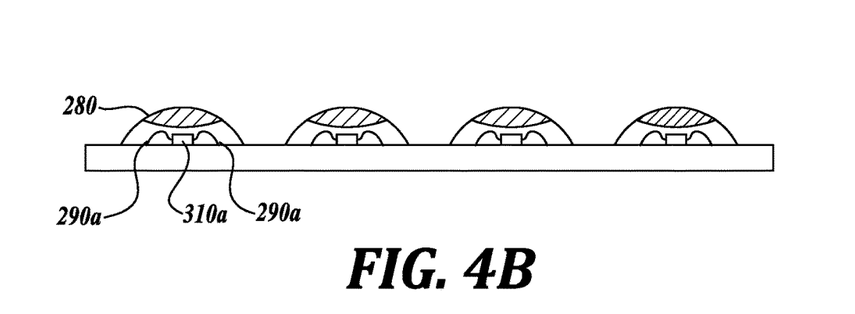
FIG. 4B is a side view of the set of input interfaces of FIG. 4A.
Figure 4C:
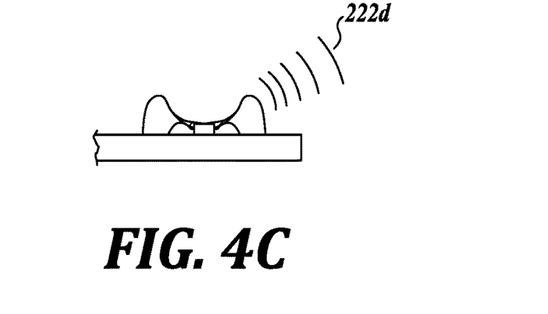
FIG. 4C is partial side view of one input interface of FIG. 4A in a depressed or actuated state.

In accordance with another aspect of the disclosure, the personal care appliance 20 may include an input interface 60 that includes a plurality of transponders 62. For example, FIGS. 4A-C illustrate an input interface 60 including a plurality of transponders 62a-62d, each including paired antennae 300a-300d and integrated circuits 310a-310d, wherein each paired antenna 300a-300d and integrated circuit 310a-310d form part of a circuit configured to be completed in response to physical actuation. FIG. 4A provides a top view of the input interface 60 and FIGS. 4B and 4C provides cross-sectional views of the input interface 60. As shown, each transponder 62a-62d includes an antenna 300a-300d, which terminates in contacts 290a-290d. The contacts 290a-290d are configured to be in conductive communication with the contact bridges 280a-280d when physically actuated, as illustrated in FIG. 4C. In an embodiment, each transponder 62 is configured to be selectively capable or incapable of transmitting a unique signal 220 by completing a circuit, and wherein the computing arrangement 48 is programmed to actuate the motor 180 assembly according to a parameter or set of parameters corresponding to and in response to each unique signal.

In some embodiments, the input interface 60 is configured to, for example, provide signals 220 that, when received by the reader 100 and decoded by the computing arrangement 48, actuates the motor assembly 180 along a range of parameters. For example, referring to FIG. 4C, wherein a transponder 62d is actuated it provides a signal 222d that, when received by the reader 100 and decoded by the computing arrangement 48, actuates the motor assembly 180 at a first frequency, a first duty cycle, etc. Likewise, when a transponder 62b is actuated it provides a signal 222b that, when received by the reader 100 and decoded by the computing arrangement 48, actuates the motor assembly 180 at a second frequency, second duty cycle, etc., that is different than, e.g., greater than or less than, the first frequency, first duty cycle, etc. In such an arrangement, a user can actuate transponders 62a-d along the length of the input interface 60 and thereby modulate the motor assembly 180 and end effector 24 along a continuum of a parameter or set of parameters, such as end effector frequency, amplitude, to name a few.

In accordance with another aspect of the disclosure, the personal care appliance 20 may include two or more input interfaces 60 that control two or more separate appliance functions, two or more treatment regimens, etc. For example, the personal care appliance 20 in one embodiment is configured with at least two drive modes that drive the end effector 24, such as brush head, in a manner that effectuates at least two treatment regimens or protocols, such as protocol 242 or protocol 244. Accordingly, in certain embodiments, the personal care appliance 20 includes first and second input interfaces 60a and 60b, each including a transponder configured to selectively transmit signals 220a and 220b, respectively, via actuation of the push-button switches. When either of the signals 220a and 220b is received by the reader 100 and decoded by the computing arrangement 48, the computing device is programmed to execute either the first protocol 242 or the second protocol 244 and actuate the motor assembly 180 according to a parameter or set of parameters corresponding to and in response to the received signal 220a or 220b. Further, in an embodiment, each of the input interfaces 60a and 60b is configured to be removably affixed to the outer surface 42 of the personal care appliance 20.

Figure 6:
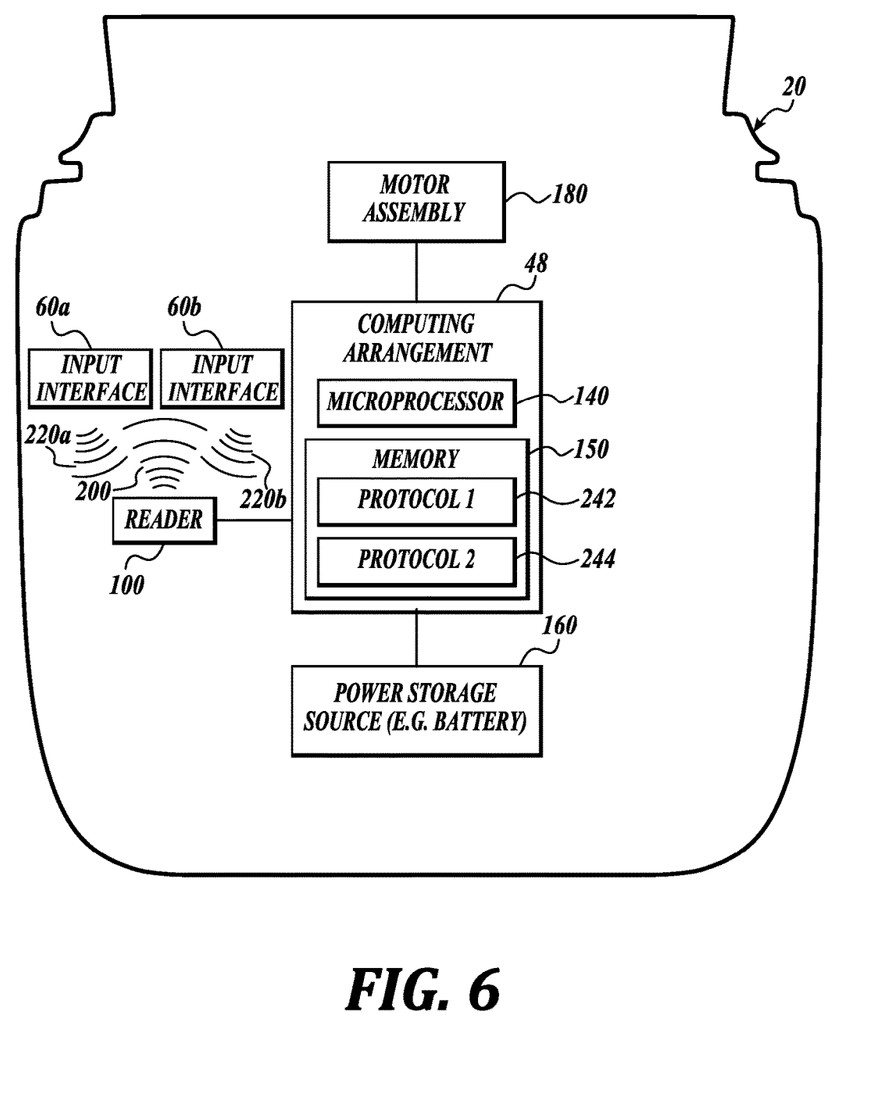
FIG. 6 schematically illustrates another representative embodiment of an appliance device in accordance with the disclosure.

A representative method of using the appliance 20 with first and second input interfaces 60a and 60b will now be described in some detail with respect to FIG. 6. Once the input interfaces 60a and 60b are affixed to the appliance 20 in user-selected locations and orientations, the appliance 20 is now ready to operate. After the appliance 20 is turned on and power is supplied to the reader 100, the reader 100 transmits an interrogation signal 200. If input interfaces 60a and 60b are within the transmission range of the interrogation signal 200, the signal 200 energizes both transponders of input interface 60a and input interface 60b.

Next, a user physically actuates the switch of input interface 60a, which accordingly transmits its unique signal 220a for reception by the reader 100. The computing arrangement 48 decodes the signal 220a and through its programmed circuitry actuates the motor assembly 180 according to a parameter or set of parameters, designated as protocol 242, corresponding to and in response to the unique signal 220a. In one embodiment, the protocol 242 relates to a first amplitude and/or frequency of which the end effector oscillates.

On the other hand, if the user physically actuates the switch of input interface 60b, the transponder of input interface 60b transmits its unique signal 220b for reception by the reader 100. The computing arrangement 48 decodes the signal 220b and through its programmed circuitry actuates the motor assembly 180 according to a parameter or set of parameters, designated as protocol 244, corresponding to and in response to the unique signal 220b. In one embodiment, the protocol 244 relates to a second amplitude and/or frequency of which the end effector 24 oscillates.

In an embodiment, the reader 100 constantly produces an interrogating signal 200 so long as the power storage source 160 is charged. In another embodiment, the reader 100 produces an interrogating signal 200 when a wired input interface, such as an on/off button, is actuated. In yet another embodiment, the personal care appliance 20 includes a motion sensor (not shown), which, when activated, causes the reader 100 to emit an interrogation signal 200 for a designated period of time. Such an embodiment conserves battery charge by only emitting an interrogation signal 200 for periods of time after the personal care appliance 20 has been moved.

While brushes are illustrated and described herein, other embodiments provide personal care end effectors 24 such as applicators and mechanical end effectors. Brushes of any size and composition can be used. Exemplary brushes include those sold by Clarisonic for use with its cleansing appliances. Exemplary applicators include elastomeric applicators, formulation applicators, heat applicators, etc. Mechanical end effectors 24 are specifically designed to apply a mechanical strain and can take the form of a massager, a circular-strain-inducing end effector, and the like.

Figure 7:
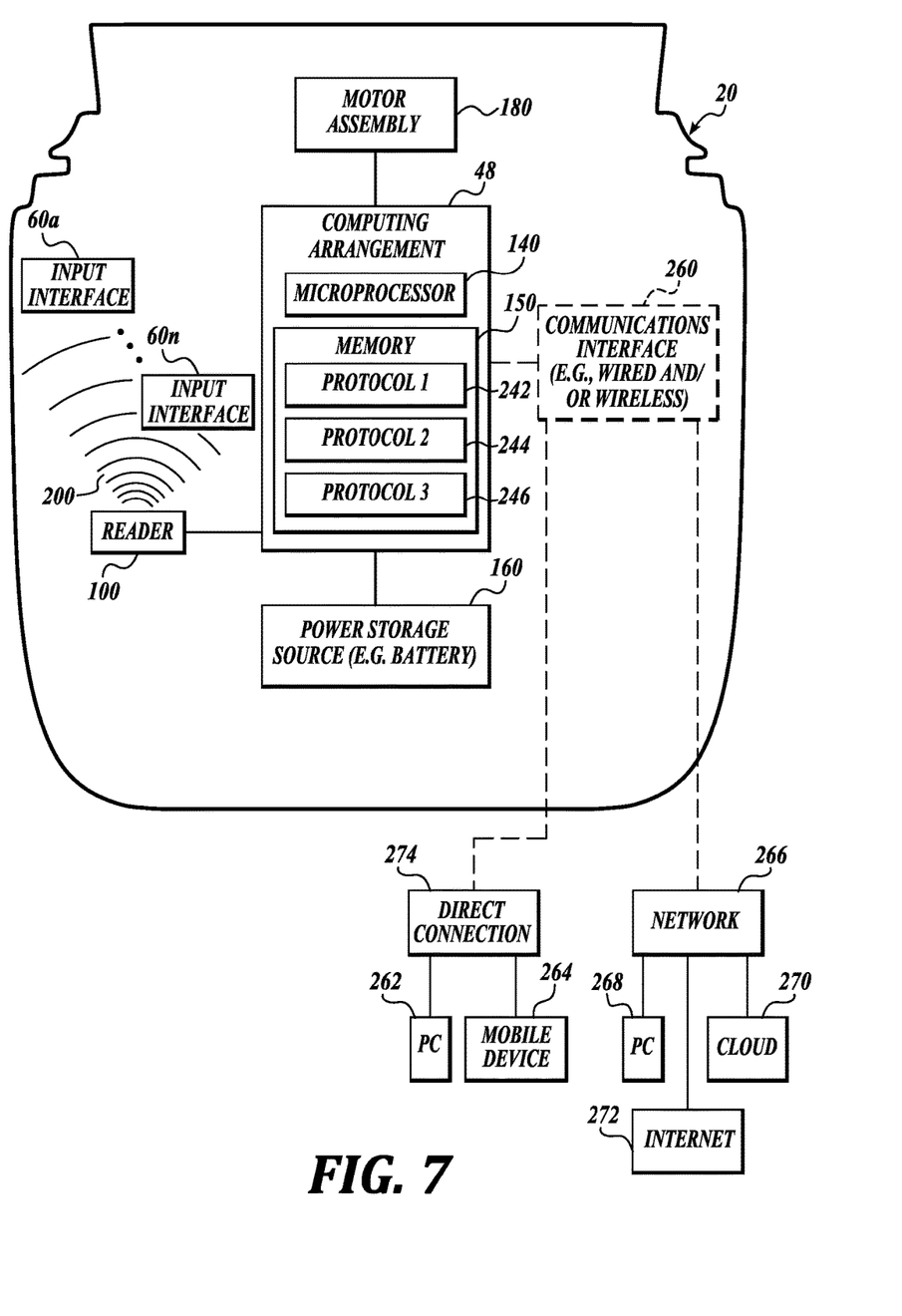
FIG. 7 schematically illustrates another representative embodiment of an appliance device in accordance with the disclosure.

In accordance with another aspect, the handheld appliance 20 may further include a communication interface 260 configured to link the appliance 20 with one or more associated client devices 262, 264, 268, 270, and 272, as shown in FIG. 7. In an embodiment, the communication interface 260 is hard wired to a client interface, as discussed further below. Additionally or alternatively, in another embodiment, the communication interface 260 wirelessly connects to a client interface, as discussed further below.

Whether wired or wireless, a direct connection 274 can be made to any client interface, such as a personal computer (PC) 262 and/or a mobile device 264 (e.g., phone, PDA, or the like). Whether wired or wireless, the communication interface 260 can be connected to a network 266 that ultimately provides a connection to any client interface, such as a personal computer (PC) 268, the internet 272, a cloud computing system 270, or the like.

The client device in one embodiment is a server, a tablet, a mobile phone, or a laptop computer. In one embodiment, the communication interface 260 includes circuits or modules configured to enable communication with the client device via a Personal Area Network (PAN), Local Area Network (LAN) or a Wide Area Network (WAN). Accordingly, the communication interface 266 is configured to communicate with a client device using standard wireless protocols (e.g., WiFi, WiMax, Bluetooth, ZigBee, Cellular, Infrared, Nearfield, etc.) or wired protocols (Universal Serial Bus or other serial communications such as RS-234, RJ-45, etc., parallel communications bus, etc.).

In one embodiment, the communication interface 260 includes circuitry configured to initiate a discovery protocol that allows the client device and the handheld appliance to identify each other and exchange control information. In one embodiment, the control information includes one or more control commands associated with at least one of a duty cycle, a pulsing mode, pulse duration, and a pulse frequency.

In an embodiment, alternatively or additionally the personal care appliance 20 includes a communication interface 260 having circuitry configured to initiate a discovery protocol that allows a client device and the handheld appliance 20 to identify each other and negotiate one or more pre-shared keys. In an embodiment, the communication interface 260 alternatively or additionally includes circuitry configured to initiate a discovery protocol that allows an enterprise server and the handheld appliance 260 to exchange protocol information.

In an embodiment, the appliance 20 includes circuitry having one or more modules optionally operable for communication with one or more input/output components that are configured to relay user output and/or input. In an embodiment, the communications interface 260 is configured to assign a parameter or set of parameters of the end effector 24 to an input interface 60 in response to instructions received from the client device. In an embodiment, the communications interface 260 is configured to assign a first protocol 242 to a first input interface 60a and a second protocol 244 to a second input interface 60b. In such an embodiment, a user can associate one or a number of input interfaces 60a and 60b with one or a number of end effector parameters of their choosing.

In an embodiment, a module includes one or more instances of electrical, electromechanical, software-implemented, firmware-implemented, or other control devices. Such devices include one or more instances of memory; computing devices; antennas; power or other supplies; logic modules or other signaling modules; sensors, gauges or other such active or passive detection components; etc.

In an embodiment, the appliance 20 includes circuitry having one or more components operably coupled (e.g., communicatively, electromagnetically, magnetically, ultrasonically, optically, inductively, electrically, capacitively coupled, or the like) to each other.

Certain embodiments disclosed herein utilize circuitry in order to operate the appliance 20, implement protocols 242 and 244, operably couple two or more components, generate information, determine operation conditions, control an appliance or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, circuitry includes one or more ASICs having a plurality of predefined logic components. In an embodiment, circuitry includes one or more FPGA having a plurality of programmable logic components.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of one or more memory devices include Erasable Programmable Read-Only Memory (EPROM), flash memory, or the like. The one or more memory devices can be coupled to, for example, one or more computing devices by one or more instructions, data, or power buses.

In an embodiment, circuitry of the client device or the appliance 20 includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operably coupled to at least one computing device to control (electrical, electromechanical, software-implemented, firmware-implemented, or other control, or combinations thereof) at least one parameter associated with the application of cyclical movement by the appliance 20, for example, controlling the duration and peak cyclic or oscillation frequency of the end effector 24 of the appliance 20.

In an embodiment, circuitry of the client device or the appliance 20 includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A personal care appliance comprising:
   an input interface configured to be removably affixed to an outer surface of the personal care appliance in a user-selectable location, the input interface including a transponder configured to be selectively capable or incapable of transmitting a signal through physical actuation;
   a reader configured to receive signals from the transponder; and
   a computing arrangement including circuitry configured to decode signals received by the reader and to actuate the personal care appliance based on the received signals.

2. The personal care appliance of claim 1, wherein the input interface is configured to wirelessly couple to the personal care appliance and to detect the personal care appliance.

3. The personal care appliance of claim 1, wherein the computing arrangement is configured to decode signals received by the reader and to actuate the personal care appliance based on the received signals.

4. The personal care appliance of claim 1, wherein the input interface is one of a plurality of input interfaces, each including a transponder configured to be selectively capable or incapable of transmitting a signal through physical actuation, and wherein each of the plurality of input interfaces is configured to be removably affixed to the outer surface of the personal care appliance in user-selectable locations.

5. The personal care appliance of claim 4, wherein each of the plurality of input interfaces is configured to be selectively capable or incapable of transmitting a unique signal.

6. The personal care appliance of claim 5, wherein the computing arrangement is configured to actuate the personal care appliance according to a parameter or set of parameters corresponding to and in response to the unique signal.

7. The personal care appliance of claim 1, wherein the reader is one of a plurality of readers.

8. The personal care appliance of claim 7, wherein the plurality of readers are configured to have partially-overlapping electromagnetic fields.

9. The personal care appliance of claim 1, wherein the reader is configured to transmit an interrogation signal, and wherein the transponder is energized upon receipt of the interrogation signal.

10. The personal care appliance of claim 9, wherein the transponder is configured to transmit a signal when a circuit of the transponder is closed and is configured to not transmit a signal when a circuit of the transponder is open.

11. The personal care appliance of claim 10, wherein a circuit of the transponder is configured to be closed or opened in response to physical actuation.

12. The personal care appliance of claim 1, wherein the input interface and the reader are configured as part of a wireless communications system selected from the group consisting of a radio frequency identification device (RFID) system, a near-field communications (NFC) system, a Bluetooth system, a magnetic reed switch system, and an optical proximity sensing system.

13. The personal care appliance of claim 1, wherein the input interface and the reader are configured as part of a radio frequency identification device (RFID).

14. The personal care appliance of claim 1, wherein the reader is configured to supply power to the transponder via the transmission of an interrogation signal.

15. The personal care appliance of claim 1, wherein the input interface includes a plurality of transponders each including a circuit including an antenna and an integrated circuit, wherein each circuit is configured to transmit a signal in response to physical actuation that completes the circuit.

16. The personal care appliance of claim 15, wherein each transponder is configured to be selectively capable or incapable of transmitting a unique signal by completing the circuit of the respective transponder, and wherein the computing arrangement is configured to actuate the personal care appliance according to a parameter or set of parameters corresponding to and in response to each unique signal.

17. The personal care appliance of claim 1, wherein the input interface is configured to be removably affixed to the outer surface of the personal care appliance via one of an adhesive and hook and loop fasteners.

18. The personal care appliance of claim 1, further comprising a communication interface configured to link the personal care appliance with an associated client device.

19. The personal care appliance of claim 18, wherein the communication interface is configured to assign a parameter or set of parameters of the personal care appliance to the input interface in response to instructions received from the client device.

20. A personal care appliance comprising:
   an input interface configured to be removably affixed to an outer surface of the personal care appliance, the input interface including a transponder configured to be selectively capable or incapable of transmitting a signal;
   a reader configured to receive signals from the transponder; and
   a computing arrangement including circuitry configured to decode signals received by the reader and to actuate the personal care appliance based on the received signals, wherein the reader is one of a plurality of readers and wherein the computing arrangement is configured to iteratively power each of the plurality of readers.

* * * * *